June 20, 1933.  J. S. CLAPPER ET AL  1,914,683

TRACTOR

Filed April 14, 1928   7 Sheets-Sheet 1

Inventors
John S. Clapper
James Ross
by Parker & Carter
Attorneys.

June 20, 1933.  J. S. CLAPPER ET AL  1,914,683
TRACTOR
Filed April 14, 1928  7 Sheets-Sheet 2

Inventors
John S. Clapper
James Ross
by Parker & Carter
Attorneys.

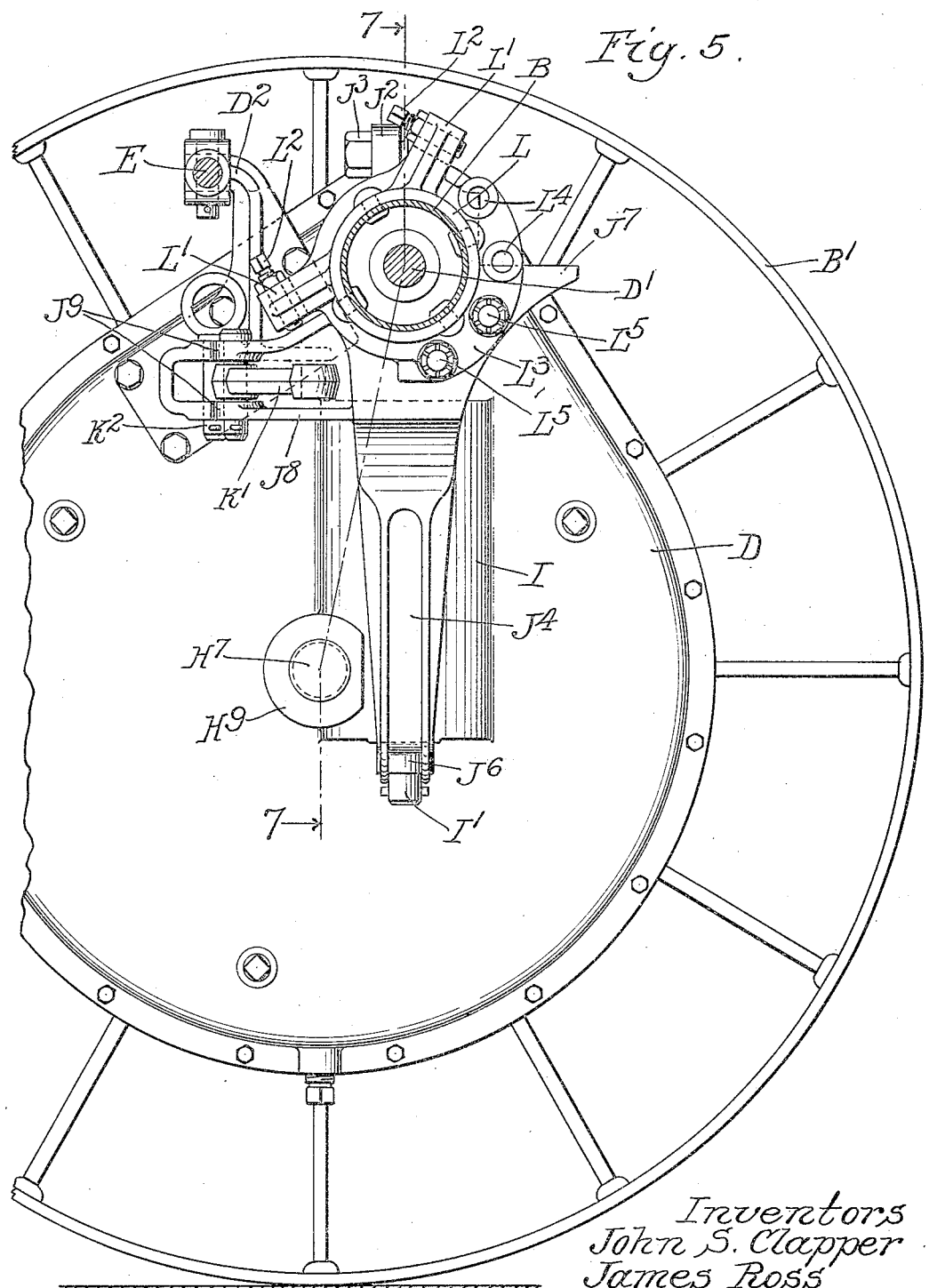

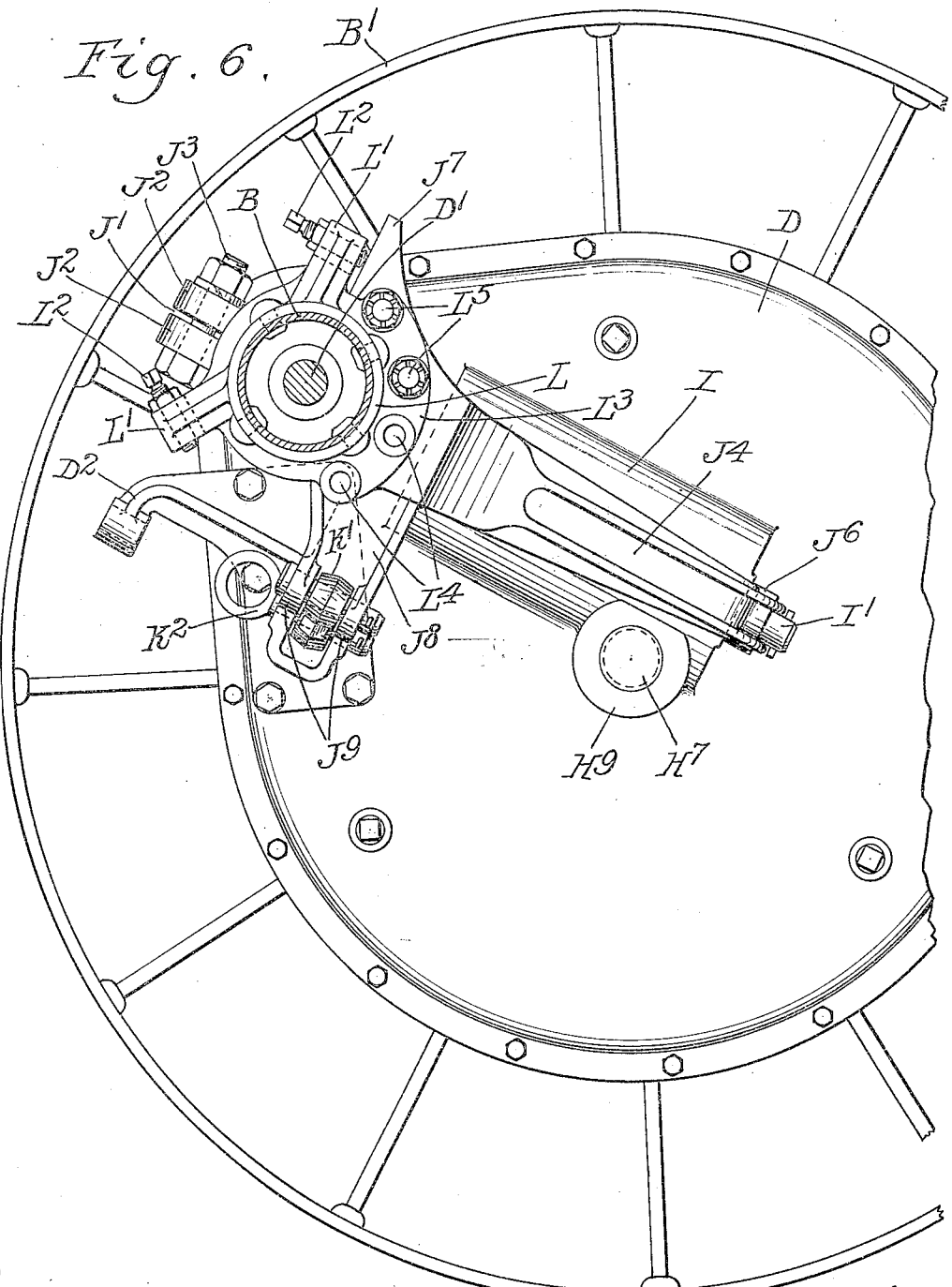

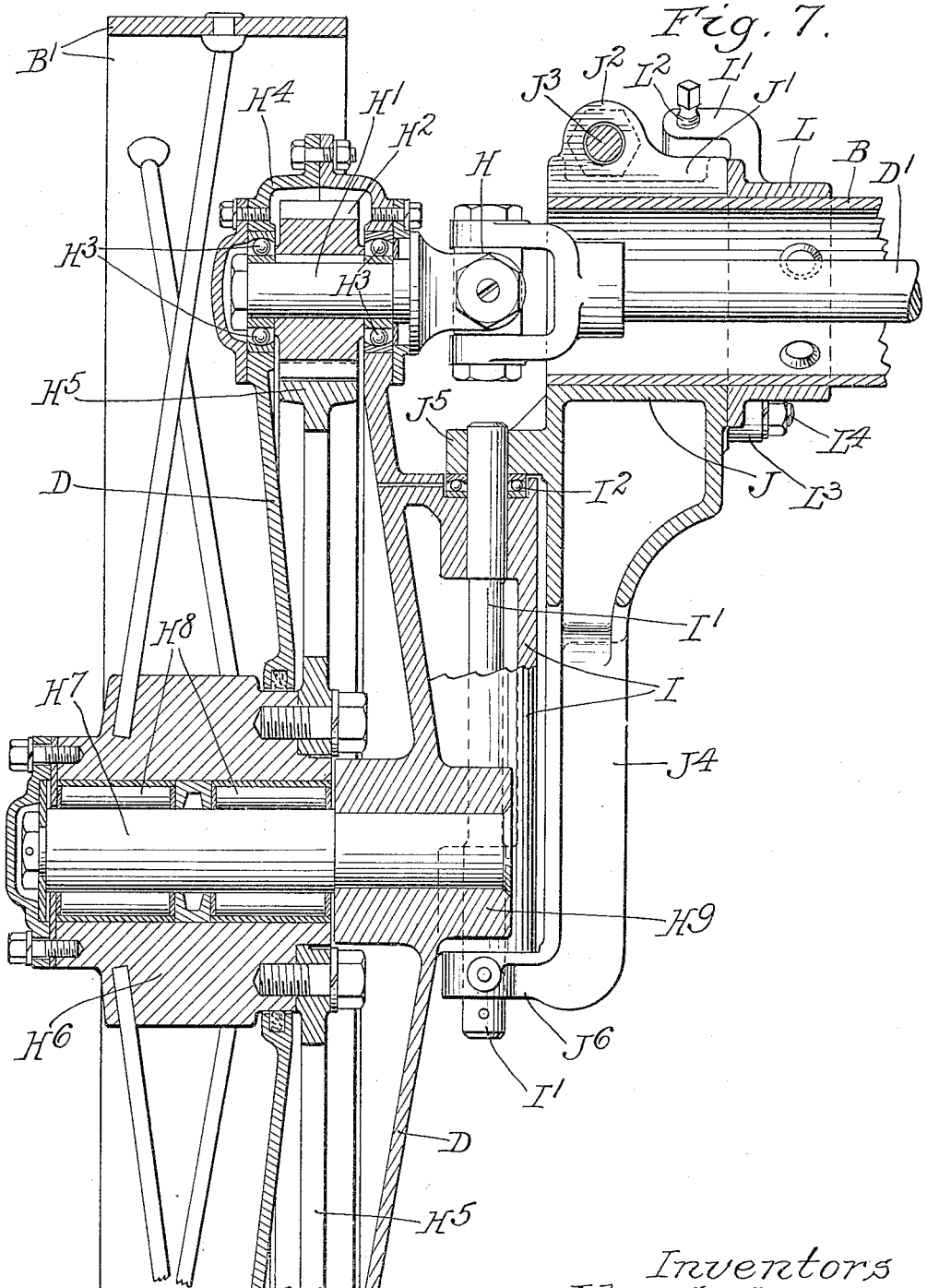

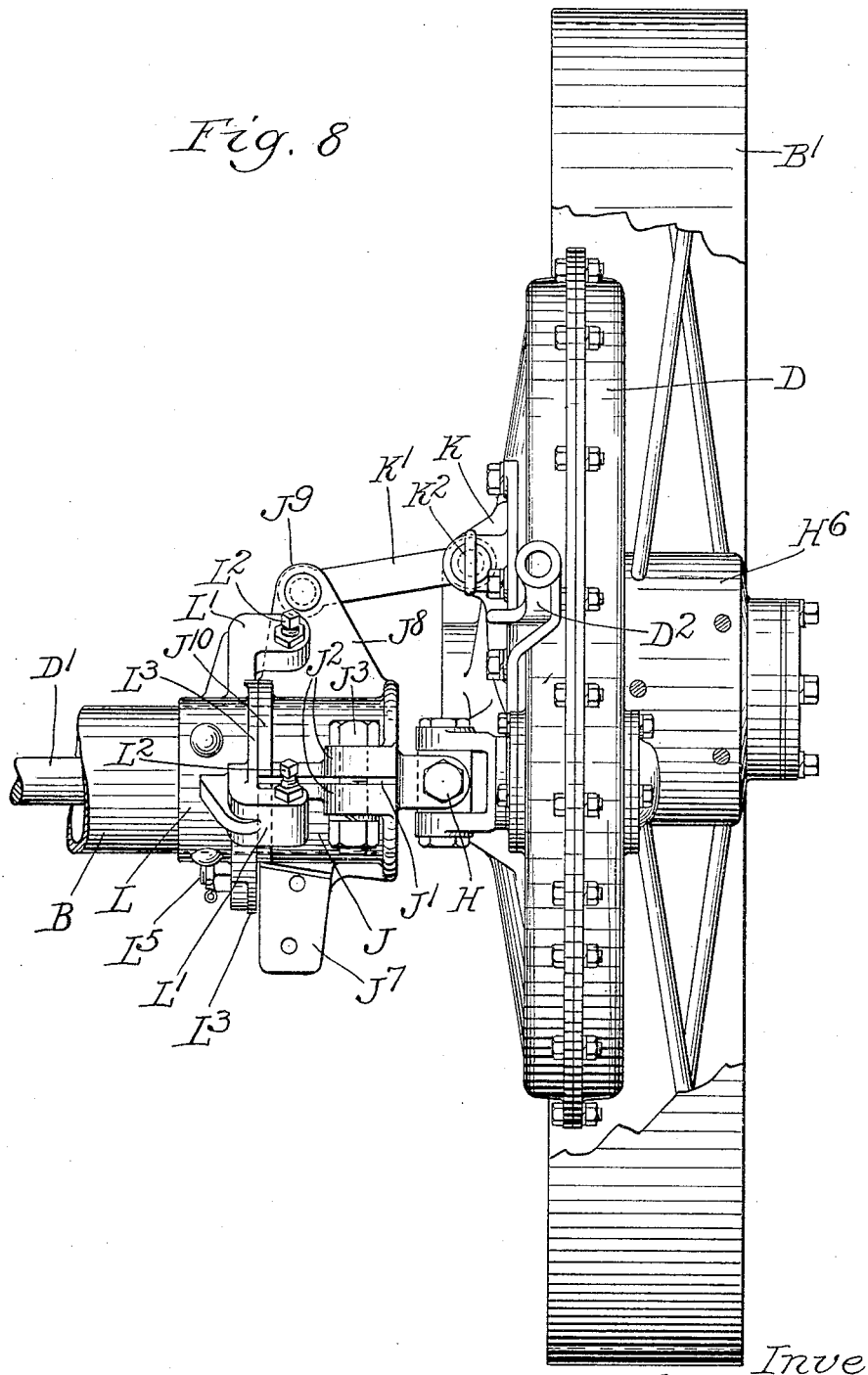

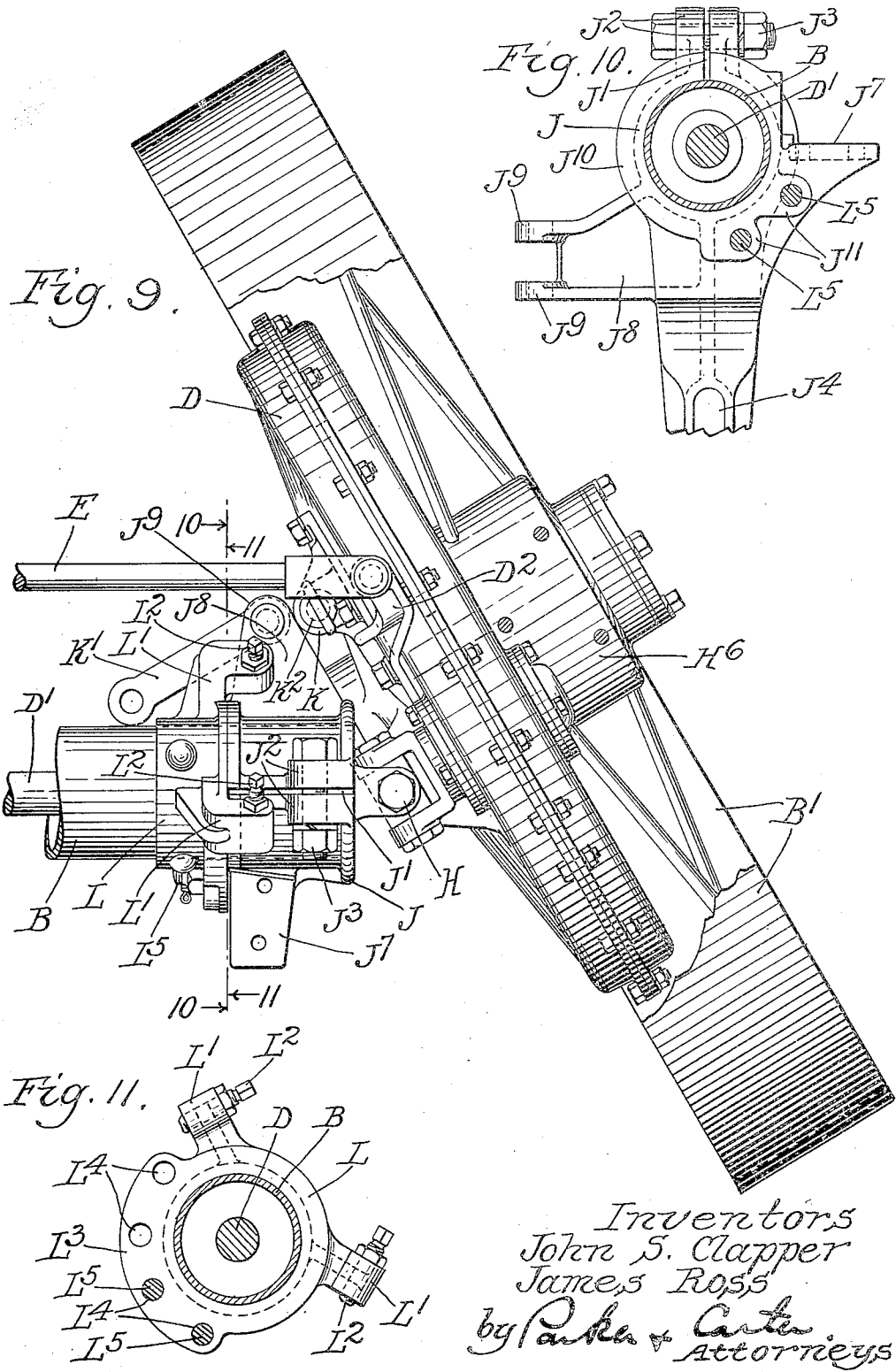

Patented June 20, 1933

1,914,683

UNITED STATES PATENT OFFICE

JOHN SAMUEL CLAPPER, OF MINNEAPOLIS, MINNESOTA, AND JAMES ROSS, OF LA PORTE, INDIANA, ASSIGNORS, BY MESNE ASSIGNMENTS, TO ALLIS-CHALMERS MANUFACTURING COMPANY, A CORPORATION OF DELAWARE

TRACTOR

Application filed April 14, 1928. Serial No. 269,942.

This invention relates to an automotive vehicle, and particularly to a vehicle which is within itself convertible. One object of the invention is to provide an automotive vehicle with means of conversion so that the height of the body of the vehicle from the ground can be adjusted or varied. Another object of the invention is to provide means within the vehicle itself so that it can, in one position of adjustment, serve as a propelling means for a cultivator and in another position of adjustment serve as a tractor. Other objects will appear from time to time in the course of the specification and claims.

The invention is illustrated more or less diagrammatically in the accompanying drawings, wherein:

Figure 5 is a longitudinal vertical cross section taken on line 5—5 of Figure 2 on an enlarged scale;

Figure 6 is a similar view taken on line 6—6 of Figure 4;

Figure 7 is a transverse vertical cross section on a further enlarged scale taken on line 7—7 of Figure 5;

Figure 8 is a plan view on an enlarged scale with parts broken away, showing the wheel arrangement of Figure 5 which is the cultivator form of the device;

Figure 9 is a view generally similar to Figure 8 showing the wheel in the position of adjustment which characterizes it when it is used as a cultivator. The position is shown as being in turned in steering. The figure itself shows on an enlarged scale the axle arrangement which appears in a smaller scale in Figure 2;

Figure 10 is a vertical cross section taken on line 11—11 of Figure 9;

Figure 11 is a vertical cross section taken on line 10—10 of Figure 9 looking in the direction opposite to that from which Figure 10 is taken.

Like parts are indicated by like characters throughout the specification and drawings.

Figure 1:
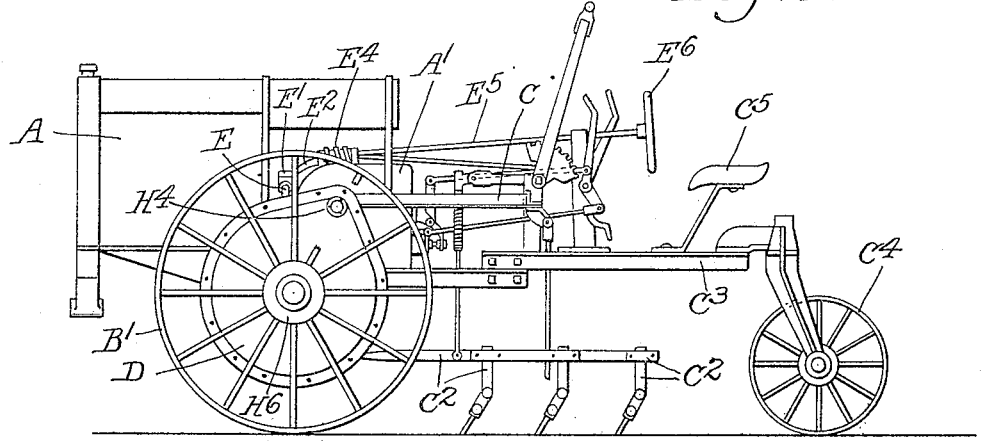
Figure 1 is a side elevation of the device when used as a cultivator, with cultivating parts shown attached.
Figure 2:
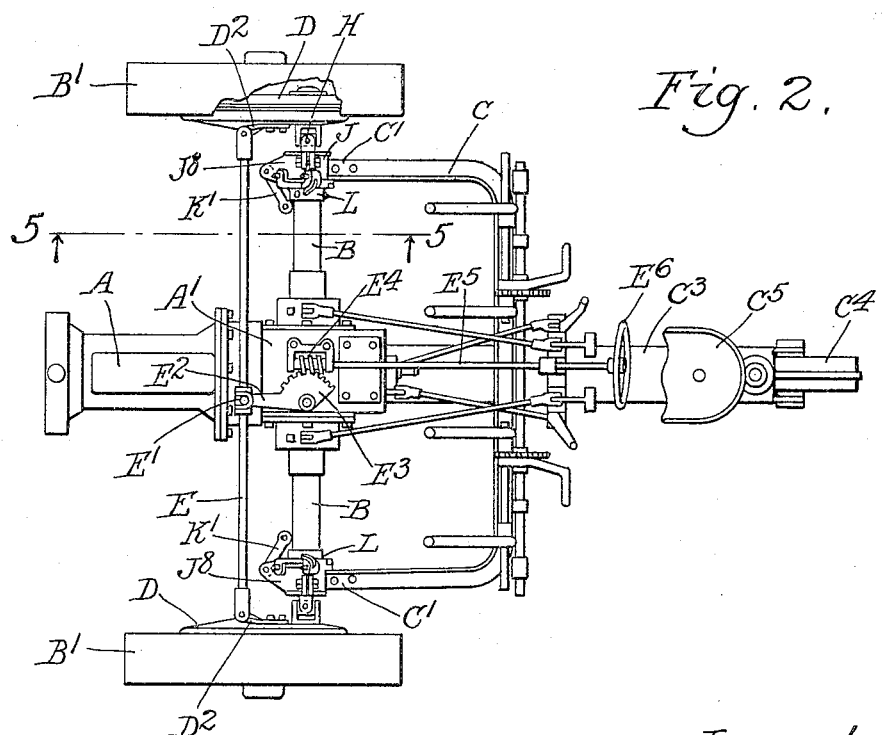
Figure 2 is a plan view of the same.
Figure 3:
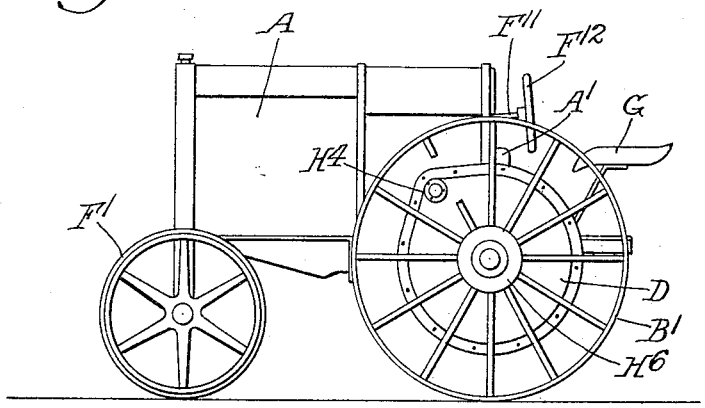
Figure 3 is a side elevation of the device in the position in which it is used as a tractor.
Figure 4:
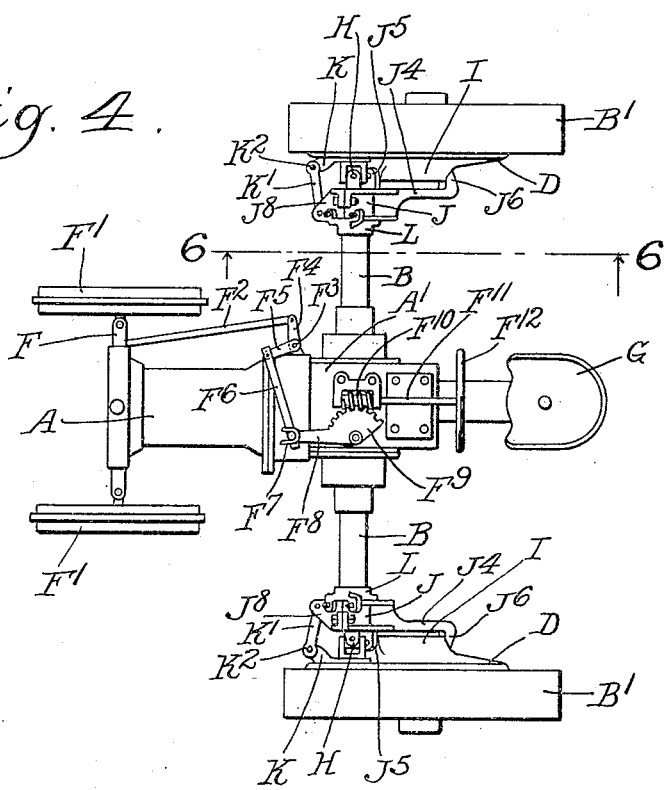
Figure 4 is a plan view which corresponds generally to Figure 2.

As shown in Figures 1 and 2, the device is adjusted for use as a cultivator. As shown in Figures 3 and 4, it is adjusted for use as a tractor. An important feature of this invention is the mounting of the main driving wheels in an adjustable manner so that without the removal of any of the driving parts these wheels may be adjusted into several different positions,—one position when the vehicle is to be used as a cultivator and another when it is to be used as a tractor. When the vehicle is used as a cultivator, the driving assembly, including the wheels, is so adjusted that the vehicle body is raised higher than in the tractor position. The cultivator can then be mounted readily under the vehicle, and the vehicle itself is high enough to clear the standing crops over which it must be driven when the cultivator is used. In this position of adjustment the vehicle is so raised that the forward or normally steering wheels of the vehicle would be raised from the ground. They are therefore removed and a rear wheel is added to balance the vehicle.

When the vehicle is to be used merely as a tractor, it is not necessary that it stand as high above the ground. The driving assembly, including the wheels, is then readjusted so as to lower the vehicle body. The removable rear wheel is dispensed with and the normal front wheels are reattached.

A represents an automotive vehicle having an engine not shown in detail. The vehicle is provided with a transmission generally indicated at $A^1$. The details of the engine of the vehicle and the transmission form no particular part of the present invention and will not be described in detail. For the purposes of this invention it is sufficient that there be an automotive vehicle provided with suitable engine and transmission.

B, B are housings which serve as supports for the wheels $B^1$ in the manner which will later be described. They serve also to carry the driving shafts which are contained within the axle housings and which drive the wheels.

C is a demountable and removable frame member which is fastened to the vehicle, for example at points $C^1$, $C^1$ when the cultivator attachment is to be used. This attachment is indicated generally as $C^2$. $C^3$ is a rearwardly directed extension which is also attached to the vehicle frame and which carries a pivotally mounted balancing wheel $C^4$. $C^5$ is a seat for the operator.

D, D are gear housings which serve to carry and inclose the driving mechanism by means of which the wheels are driven from the shafts $D^1$. $D^2$, $D^2$ are steering attachments formed on or fastened to the gear housing D and to them may be attached the steering parts.

In the form shown in Figure 2, that is, in the cultivator form, the steering is accomplished through a connecting rod E. It is attached at each end to the members $D^2$. It has a central connecting part $E^1$ in which is mounted one end, $E^2$, of an extension formed on quadrant $E^3$. $E^4$ is a worm meshing with the quadrant $E^3$ and carried by the steering rod or column $E^5$. The steering rod carries at its outer or free end a steering wheel $E^6$. We shall not describe in detail the other controlling parts of the vehicle, such as the clutch and brake mechanisms and the means for handling the cultivator tool, as these form no specific part of the present invention.

In the tractor form illustrated in Figures 3 and 4, the wheel parts and driving parts are the same as those shown in the other form above described. They are merely in a different position of adjustment. This position and the means of obtaining it will be described later. In this form of the device, as has been pointed out above, the vehicle itself is closer to the ground than in the cultivator form. In this form there is a short axle F which is attached to the forward end of the vehicle and this axle carries wheels $F^1$. In this form a steering rod connects the two wheels. This is not shown, as the details form no specific part of the invention. A reach rod $F^2$ is connected to the steering wheel. A generally vertical shaft $F^3$ is mounted for rotary movement on the sides of the vehicle at its lower end and carries a crank arm $F^4$ which is pivoted to the rear end of the member $F^2$. At its upper end it carries another crank arm $F^5$. $F^6$ is a connecting rod pivoted at one end to the crank arm $F^5$ and pivoted at the other to the yoke $F^7$ which is carried on the extension $F^8$ of the quadrant $F^9$. This quadrant is in mesh with the worm $F^{10}$, carried on the steering rod $F^{11}$, which rod itself has at its outer end a steering wheel $F^{12}$.

G is a seat for the operator.

We shall now describe the mounting or driving parts of the wheels. The shafts $D^1$ are inclosed within the axle housing B. Each of them terminates at its outer end in a universal joint H. Beyond the universal joint and attached to it is a shaft $H^1$ carrying a driving pinion $H^2$. This shaft is supported in anti-friction bearings $H^3$ which are themselves carried in an enlargement $H^4$ of the main gear housing D. This housing is, as shown, formed of two parts. Within the housing is positioned a driving gear $H^5$ which is in mesh with the pinion $H^2$ and adapted to be driven through it from the shaft $D^1$. The gear $H^5$ is fastened to the hub $H^6$ of the wheel $B^1$. The wheel itself is carried on a stub shaft $H^7$ which is supported in anti-friction bearings $H^8$. At its inner end the stub shaft $H^7$ is fastened in the enlarged boss $H^9$ formed in the inner side of the gear housing D.

I is a generally cylindrical enlargement on the inner side of the gear housing D. It incloses a spindle shaft $I^1$ and thus serves, when it is in vertical position as shown in Figures 5 and 7, as a supporting member for the wheel and gear housing and a pivot point about which they may be turned in steering. $I^2$ is an anti-friction bearing about the shaft $I^1$ and resting upon the upper end of the enlargement I.

J is a collar member adapted to be mounted about the outer end of the housing B. It is slit as at $J^1$ and provided with two upwardly extending ears $J^2$, $J^2$ and a fastening means $J^3$, which is here shown as a nut and bolt combination by means of which the ears may be drawn together to grip the casing member B to hold the collar and its assembled parts rigidly in position thereon. Extending downwardly from the collar J is a member $J^4$. Adjacent its upper end it carries a lateral extension $J^5$ which serves as a support for the upper end of the spindle $I^1$. The bearing $I^2$ is also in contact with its lower face. At its lower end the member $J^4$ carries a second lateral extension $J^6$ in which is supported the lower end of the spindle $I^1$. $J^7$ is a stop member mounted on the collar J. $J^8$ is a brace attaching extension terminating in two perforated ears $J^9$, $J^9$. $J^{10}$ is a flange on the member J. It is provided with a plurality of perforated, laterally extending ears $J^{11}$.

K is a perforated ear or extension which is mounted on the inner side of the gear housing D. It may be formed integrally therewith or may be separately formed and attached thereto. $K^1$ is a bracing member. When the vehicle is in the tractor adjustment and when steering is carried out by the pair of small front wheels, the bracing member $K^1$ is positioned so that one end of it is fastened between the ears $J^9$, $J^9$ and so that its other end is fixed in the member K. $K^2$ is a pin terminating at its upper end in a ring which may be used to fasten the member $K^1$ to the member K. As shown here the member K is actually integral with the steering attachment part D². This arrangement might be varied.

L is a collar, bolted, riveted or otherwise permanently fastened adjacent the outer end of the housing B but inside of the position of attachment of the collar J. This member carries two stops L¹, L¹, each of which is perforated and in each of which is positioned a set screw L². It carries also a laterally extending flange L³ which is provided with a plurality of perforations L⁴. These perforations are brought into register with the perforations in the ears J¹¹ of the member J, and bolts L⁵ are secured in position in these perforations to hold the parts in the adjusted position. The plurality of holes makes possible a variety of positions of adjustment. Thus in Figure 5, which is the position of adjustment when the vehicle is used as a tractor, it will be seen that the two holes in the ears J¹¹ are in register with the two lower holes L⁴. In the position of adjustment shown in Figure 6 it will be seen that the two holes in the ears J¹¹ are in register with the upper holes L⁴.

It will be realized that while we have shown and described an operative device, many changes might be made in the size, shape, number and relation of parts without departing materially from the spirit of the invention, and we wish, therefore, that the description and showing be taken in a large measure, as diagrammatic.

The use and operation of this invention are as follows:

Assuming that the vehicle is in the tractor arrangement, the main driving wheels will be in the position of adjustment shown in detail in Figure 6. In that position the spindle which carries the wheel is not vertical. Steering is carried out by the use of the small pair of wheels in front. The main driving wheels are therefore locked against turning by means of the bracing member K¹ which is fastened as shown particularly in Figure 4. In this position of adjustment which is illustrated in Figure 6 the holes in the ears J¹¹ are in register with the upper holes L⁴ in the member L³. Power is transmitted to the wheels from the engine through the usual transmission shaft and differential and then through the extended shafts D¹ through the universal to the pinion which drives the gears. The steering is carried out by the mechanism shown in the plan view in Figure 4.

When now it is desired to change the adjustment of the parts and use the vehicle in connection with a cultivator, the wheels are rotated until the spindle I¹ becomes generally vertical, as shown particularly in Figures 5, 7, and 8. Figure 8 really shows the parts in an intermediate stage of adjustment. They have been moved so as to raise the axle of the vehicle from the position shown in Figure 6 to that shown in Figure 7 and the spindle has been brought into a vertical position. The fastening or bracing member K¹ is still in position and the connecting rod E for steering has not been put in place. As shown in Figure 9, the member K¹ has been disconnected from its point of attachment on the gear housing D and swung back out of place. The connecting rod E for steering is in position and the wheel is shown as in the position for steering.

From Figures 5, 10 and 11 it will be apparent that in the cultivator position of adjustment the holes in the ears J¹¹ are in register with the lower holes L⁴ in the member L³.

When the frame C is fastened to the vehicle to make it a cultivator, as shown particularly in Figures 1 and 2, the frame is normally attached to the stop member J⁷. Any other attachment could be used, but this is the preferred form.

We claim:

1. In combination in a vehicle, a frame, supporting members therefor, carrying parts associated therewith and adapted to support the frame from said members, means for adjusting the position of said carrying parts whereby the adjustment of the frame above the ground is varied, said carrying parts adapted, in one position of adjustment only, to serve as steering members for the vehicle.

2. In combination in a vehicle, a frame, supporting members therefor, carrying parts associated therewith and adapted to support the frame from said members, means for adjusting the position of said carrying parts whereby the adjustment of the frame above the ground is varied, said carrying parts adapted, in one position of adjustment only, to serve as steering members for the vehicle, and adapted, in another position, to be locked against lateral movement.

3. In combination in an automotive vehicle, a frame, an engine, supporting members for said frame, carrying parts associated with said frame and supporting members and adapted to support the frame from said members, driving parts connecting the supporting members with the engine and means for adjusting the position of said carrying parts whereby the adjustment of the frame above the ground is varied, said driving parts being effective in all positions of adjustment, said supporting members adapted to serve as steering members in one position of adjustment only.

4. In combination in a vehicle, a frame and supporting wheels therefor, said wheels adjustable with relation to said frame whereby the height of said frame above the ground may be varied, parts joined to said frame and connected to said wheels and adapted, themselves, while remaining joined to the frame, to be moved to accomplish the variation in the height of the frame above the ground, said wheels adapted to serve as steering wheels in one position of adjustment only.

5. In combination in a vehicle, a frame and supporting wheels therefor, said wheels adjustable with relation to said frame whereby the height of said frame above the ground may be varied, parts joined to said frame and connected to said wheels and adapted, themselves, while remaining joined to the frame, to be moved to accomplish the variation in the height of the frame above the ground, the axis of rotation of said wheel being out of alignment with their supporting parts.

6. In combination in a vehicle, a frame and supporting wheels therefor, said wheels adjustable with relation to said frame whereby the height of said frame above the ground may be varied, parts joined to said frame and connected to said wheels and adapted, themselves, while remaining joined to the frame, to be moved to accomplish the variation in the height of the frame above the ground, the axis of rotation of said wheel being out of alignment with their supporting parts, said wheels adapted to serve as steering wheels in one position of adjustment alone.

7. In combination with an automotive vehicle, a frame and an engine and driving wheels therefor, a driving connection from said engine to said wheels, means for rasing and lowering said frame with respect to said wheels whereby the height of the frame above the ground may be varied, parts joined to said frame and connected to said wheels and adapted, themselves, while remaining joined to the frame, to be moved to accomplish the variation in the height of the frame above the ground, said driving wheels adapted to serve also as steering wheels in one position of adjustment alone, said driving connection being operative irrespective of the position of adjustment.

8. In combination in an automotive vehicle, a frame and an engine supported therefrom, a running gear assembly adapted to carry said frame and means for rotating said assembly as a whole to vary the vertical position of adjustment of said frame with respect to the ground, parts of said running gear adapted to serve as steering gear in one position of adjustment alone, and means adapted to be locked against steering in another position of adjustment.

9. In combination in an automotive vehicle, a frame and an engine, main supporting and driving wheel members, a carrying assembly associated therewith and adapted to support the frame from the said wheel members, the axis of said supporting assembly being out of alignment with the axis of rotation of said wheel members, said wheel assembly adapted for rotary adjustment as a whole with respect to said frame whereby the height of the frame above the ground is varied, said wheel members adapted in one position of adjustment to serve as steering wheels, and means adapted in another position of adjustment alone to be locked against lateral motion, the means for driving said wheels remaining identical and effective in all positions of adjustment.

Signed at Phoenix, Arizona, this 25th day of March, 1928.

JOHN SAMUEL CLAPPER.

Signed at La Porte, Indiana, this 2nd day of April, 1928.

JAMES ROSS.